United States Patent
Kraus (10) Patent No.: US 10,389,805 B1
(45) Date of Patent: Aug. 20, 2019

(54) DISTRIBUTED DATA CACHE AS CONTENT ARCHIVE

(71) Applicant: Amazon Technologies, Inc., Reno, NV (US)

(72) Inventor: Holger Kraus, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 96 days.

(21) Appl. No.: 15/587,274

(22) Filed: May 4, 2017

(51) Int. Cl.
*G06F 15/16* (2006.01)
*H04L 29/08* (2006.01)

(52) U.S. Cl.
CPC ...... *H04L 67/1074* (2013.01); *H04L 67/1002* (2013.01); *H04L 67/18* (2013.01)

(58) Field of Classification Search
USPC ............... 709/217, 216, 201, 202, 212, 213
See application file for complete search history.

*Primary Examiner* — Lan Dai T Troung
(74) *Attorney, Agent, or Firm* — Hogan Lovells US, LLP (57) ABSTRACT

Copies of content no longer available from a network location can be generated using content cached by client devices that have accessed that location. A service provider who collects information as to the locations accessed by these devices can determine which devices might have at least some of the content still in cache memory or other such storage. Client devices having accessed that location can be contacted to obtain copies of the content previously available. A number of the copies are compared and inconsistent content removed in order to prevent the disclosure of personalized or customized content. A tree or other structure of the page can be analyzed to ensure that the page will display properly and that comparable content is compared. When a version is generated that includes only consistent content consistent, that version can be provided as an accurate archive copy.

20 Claims, 7 Drawing Sheets

DISTRIBUTED DATA CACHE AS CONTENT ARCHIVE

BACKGROUND

Users are increasingly consuming content electronically. Since content has been available over public networks such as the Internet for decades, and the content changes over time, it often is difficult to retrieve content that was available at some point in the past. While some services offer archive capability, only a small fraction of the once available content is contained within these archives. Due to the sheer volume of content available, it is impractical at best to attempt to provide a single, well-indexed archive source for this content that maintains a copy of the content and makes it available for consumption.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide approaches for locating and obtaining content in an electronic environment. In particular, approaches provide the ability to offer content that may no longer be available from the original location without the need to maintain a large database of indexed content. A service provider might offer content for millions or even billions of client devices, many of which are able to cache content for at least a period of time. If the service provider collects information as to the locations these devices accessed, such as by using a web browser or other such application executing on the devices, then a determination can be made as to which devices might have content for a particular location in cache memory or other such storage. Upon receiving a request for content that is no longer available from a specified location, such as a web address, the service provider can contact client devices that are known to have accessed content from that location to attempt to obtain copies of the content. At least some of these copies, such as a fixed number, can be compared and inconsistent content removed in order to prevent the disclosure of personalized or customized content. A tree or other structure of the page can be analyzed to ensure that the page will display properly and that corresponding content is compared. When a version is generated that only includes content consistent over the various copies, that version can be provided as an accurate offline or archive copy of the content. Images, widgets, or other content can be provided with the page or made available for inclusion as would have been performed for the page as originally provided. Such an approach enables the archive copy to be obtained and provided without a centralized data store but instead using consumer-owned distributed caches, and other such storage sources, to locate and regenerate the content.

Various other functions can be implemented within the various embodiments as well as discussed and suggested elsewhere herein.

Figure 1:
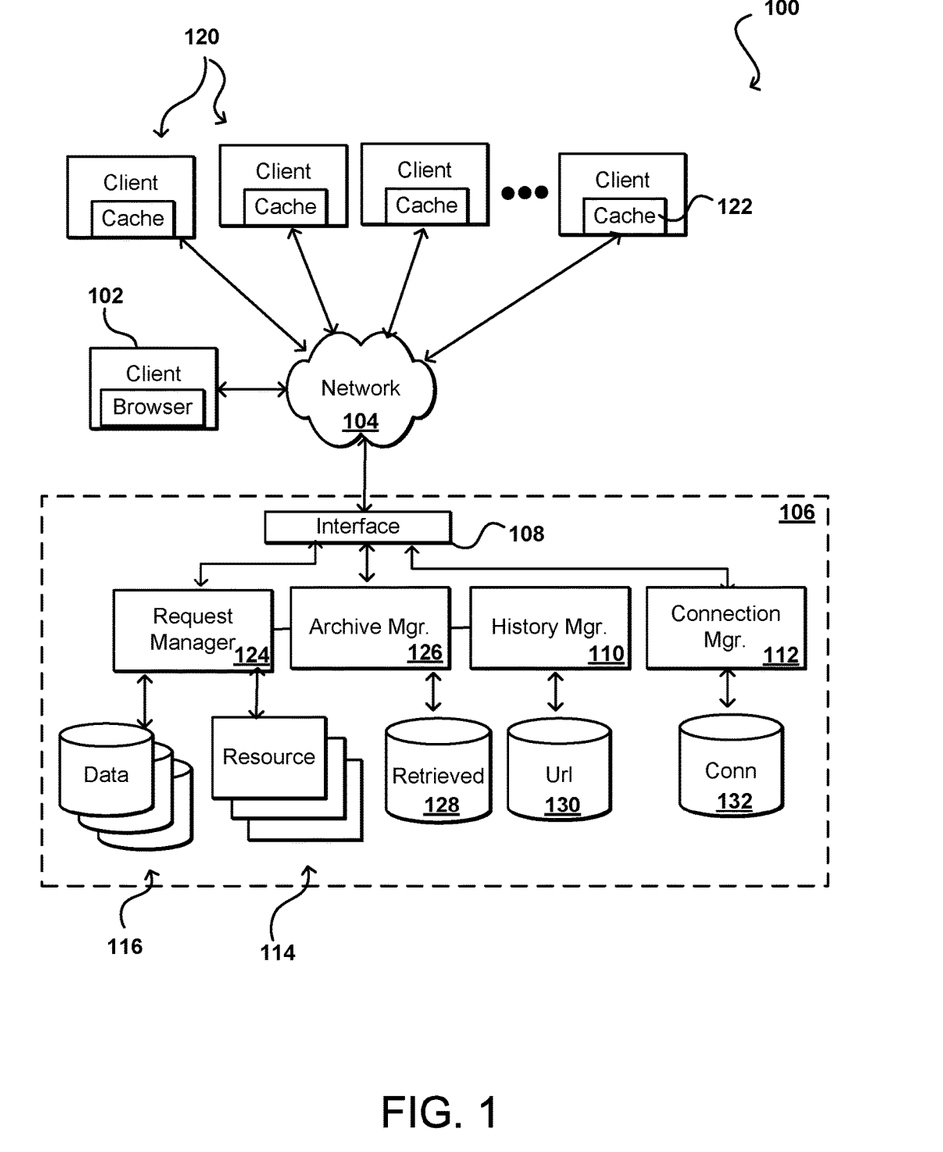
FIG. 1 illustrates an example distributed cache-based approach to obtaining content that can be utilized in accordance with various embodiments.

FIG. 1 illustrates an example environment 100 in which aspects of the various embodiments can be implemented. In many instances, a browser executing on a client device 102 will be provided by an entity that is associated with the resource provider environment 106. The entity, such as a service or content provider, may obtain information entered or accessed through the browser, such as where the user has enabled such collection. A history manager 110, or other such system or service offered using resources of the resource provider environment, will obtain information identifying each address (i.e., uniform resource locator (URL)) accessed using the browser on the client device 102, as we as those of other clients 120 executing a similar browser associated with the entity. Other methods of collection can be utilized as well. The history manager 110 can then store the URL data, along with information about the associated user or another such identifier, as well as a timestamp or other such information to an appropriate data store 130. In at least some embodiments, the history manager 110 can then maintain a full or partial browse history for a user, browser, device, or other such entity based at least in part upon the collected information. A request manager 124 can manage the direction of requests to various resources 114 in the environment.

In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. As illustrated in the implementation 200 of FIG. 2, when a request to provision a resource is received to the interface layer 108, information for the request can be directed to a resource manager 202 or other such system, service, or component configured to manage user accounts and information, resource provisioning and usage, and other such aspects. A resource manager 202 receiving the request can perform tasks such as to authenticate an identity of the user submitting the request, as well as to determine whether that user has an existing account with the resource provider, where the account data may be stored in at least one data store 204 in the provider environment. The identity information can be provided and/or verified by an identity service 206 in at least some embodiments, which can maintain identity information or credentials in a local data store 208. The identity service can be part of the resource provider environment or offered by a third party, among other such options. The identity service can provide information about identity, credentials, access roles, and the like. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Figure 2:
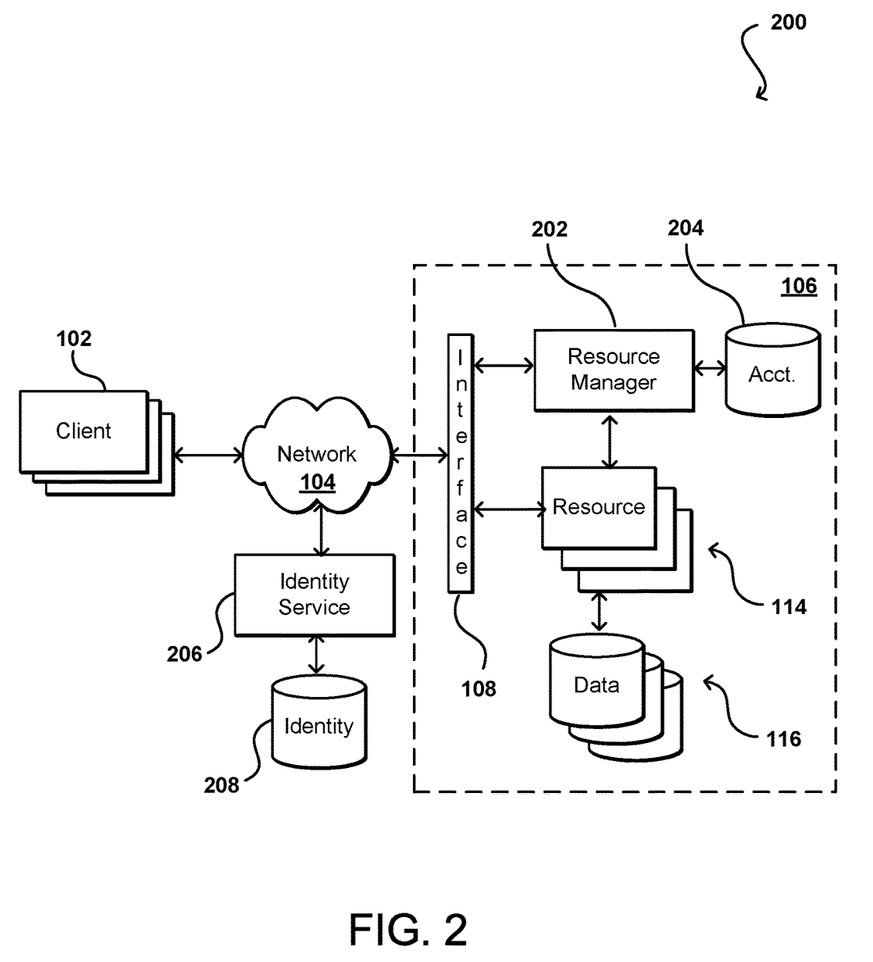
FIG. 2 illustrates an example environment in which various embodiments can be implemented.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 202, at least until such time as a relevant aspect of the user account changes, the user is no longer granted access to the resource, or another such aspect changes.

The resource manager 202 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, such an environment enables organizations to obtain and configure computing resources over a network such as the Internet to perform various types of computing operations (e.g., execute code, including threads, programs, software, routines, subroutines, processes, etc.). Thus, customers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

It might be the case that a user is interested in accessing content that is no longer accessible. This could be, for example, due to the fact that a new version of the content has been provided in its place or that the content is no longer available from the associated location or address, among other such options. Some sources, such as the Wayback Machine Internet archive, enables users to search for content that was previously available. As mentioned, however, these sources typically only provide a small fraction of the available content because a copy of the content must be stored on specified servers. This can require a significant amount of memory that comes with a significant cost, such that it is only practical to store a subset of what is available. Further, the copies are often incomplete because the links to images or content also point to content that is no longer available.

As known for browsers and similar content rendering applications, much of the content displayed will be stored in cache memory, or another such temporary storage. Since the content typically must be downloaded over a network connection, browsers will cache content locally such that if the browser needs to display that content again the content will not need to be retransmitted. This allows for faster display, as well as reduced data transmission requirements, which can save time and money for the user, as well as the providers of the content. The length and amount of content stored for a browser can vary based upon settings, capacity, and other such factors.

Approaches in accordance with various embodiments can take advantage of the fact that much of the content available across a network such as the Internet will have been accessed by multiple devices and rendered in the corresponding browsers. Accordingly, at least some of these devices can have the content stored in local cache memory. The ability to access the content from these cache memory locations provides a distributed content repository from which the content can be obtained. Simply pulling the content from one of these caches is not straightforward, however. For example, there often are not connections available that enable the content to be pulled from these devices. Further, there may be personal information cached for a particular user that should not be shared with others or made publicly available. Further still, there may be customizations or different versions available and it may be undesirable to simply select one of these at random for display, among other such issues.

Accordingly, approaches in accordance with various embodiments can attempt to locate multiple versions of the content in an attempt to determine content that was available to all users from that location, which will eliminate the exposure of personalized content. Further, the ability to examine multiple versions can help to eliminate errors and ensure that the version provided is as accurate as possible. In some cases the images or other content that are linked by the page may no longer be available, such that analyzing multiple caches for the page can also help to locate cached versions of that content that can be provided along with the page, etc. It is also possible to piece together a page using content from multiple caches, such as where one device has a first image and another device has a second image to be included on the page.

In the example configuration 200 of FIG. 2, information for a request for content can be directed to an archive manager 126, for example, which can be tasked with attempting to obtain a copy of the requested content where that content is no longer available from the identified source. The archive manager 126 in this example can contact a history manager 110, or other such system or service, which can maintain history information for each user, device, session, or other such entity. In one embodiment, history information will be tracked by user, regardless of the number of devices or browsers used, at least where such information is available. The history information can include, for example, URL or address information, as well as a timestamp of the last access of that URL. Other identifiers, timestamps, or data can be stored as well in various embodiments. When a request for content at a particular address or URL is requested, the history manager 110 can be contacted to execute a query against the history data store 216 to identify clients 104 that have accessed that address, at least over a recent or specified period of time. The history manager 210 can locate all such clients or at least a minimum number of clients, such as at least 100 clients. In some embodiments a specified number of clients will be identified where possible.

In some embodiments, the identified client data might be checked against a connection manager 112 that can determine whether an appropriate connection exists that can enable any relevant content to be obtained from a specific client. The connections can include, for example, long-lived history-sync connections. The connections can utilize a heartbeat or other such mechanism in order to keep the connections active while utilizing very few resources. The connection manager 112 can consult information in a connection repository 132, for example, to determine which of the identified clients have existing connections, as well as potentially information about the types or capabilities of those connections. The information can be reported back to the history manager 110 and/or archive manager 126 in order to determine which clients to contact regarding the content. As mentioned, in some embodiments an attempt will be made to identify a specific number of clients to contact, although in other embodiments this might be an initial amount and additional attempts can be made until a minimum number of clients respond, etc.

The archive manager 126 can then contact the appropriate browser (or other) software executing on the identified client devices 202 to attempt to determine whether any of those devices is storing at least a subset of the content of interest in a local cache 204 on the device (or in another respective location). For a webpage, this can include determining whether the HTML for the page is stored in cache. As mentioned, for some embodiments this can also include at least determining whether images, CSS files, widgets, or other content for the page are cached on the device as well. For content such as HTML content, the browser application on the client device 204 can cause the HTML file to be transmitted over the established connection to be received by the archive manager 126. The HTML file can be stored locally to the archive manager 126 for analysis, such as by storing the file to a retrieved data store 128 or other such repository.

As mentioned, it can be desirable in at least some embodiments to ensure that no personal, confidential, or private information is inadvertently conveyed with the content. Further, it can be desirable to ensure that the version of the content sent to the requesting client is an accurate representation of the content as of the date or time specified. Accordingly, in at least some embodiments it can be desirable to receive the HTML for a webpage from multiple sources and compare the HTML to ensure consistency from multiple sources. For at least some pages or sources, a confirmation from a minimum number of sources that the HTML is the same can be sufficient to enable the content to be provided as an accurate copy. This can include, for example, at least three or five copies from different sources that include the same content.

It will often be the case, however, that at least some of the HTML or other code for a page will differ for different users, devices, sessions, or instances. This might be due to the inclusion of personalized content for display, or might include information such as user identifier or account information in the code when generated that, even though it may not be displayed, may be discoverable through the code. Further, there may be advertising or other content that may be presented to various users that will vary by subsets of users. While the advertising may have been displayed, it is not necessarily part of the content that should be presented to the requesting user, as there may be contractual or other issues that may complicate the presenting of that content. Simply selecting two copies of the page at random might result in the same advertising being displayed, or same personalizations being used, etc. Thus, in some embodiments it is desirable to get a consensus as to a larger number of copies, such as ten copies that all include the same content, before that content is approved to be provided as an accurate copy.

Figure 3A:
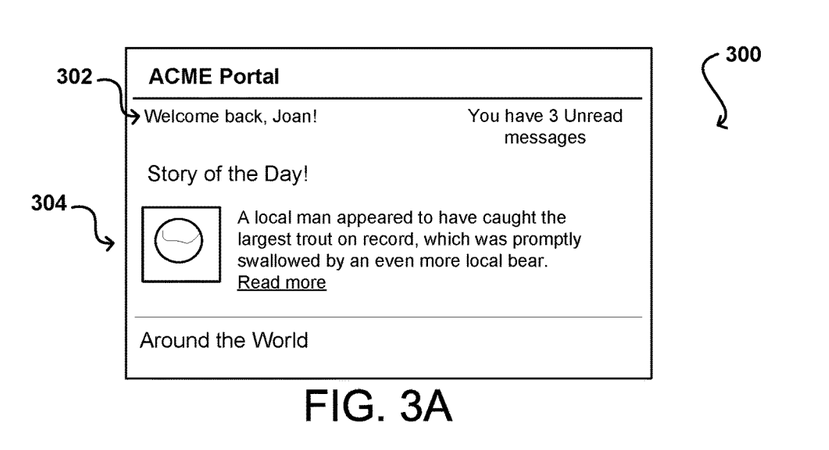
FIGS. 3A, 3B, and 3C illustrate example interfaces that can be displayed in accordance with various embodiments.
Figure 3B:
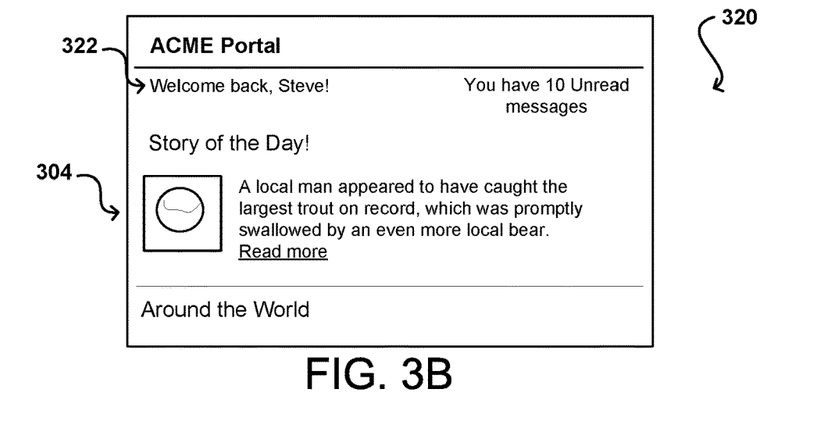
Figure 3C:
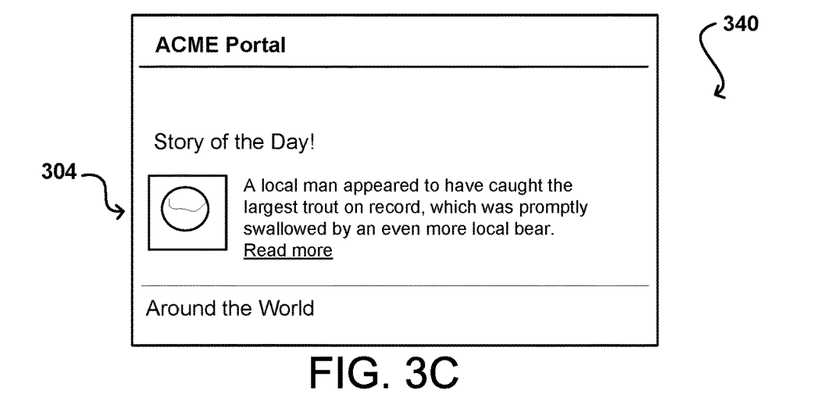

Even for pages where some amount of user information or personalization may be displayed, a significant portion of the content may still be similar between versions. As an example, the displays 300, 320 of FIGS. 3A and 3B illustrate content that would be displayed, for the same webpage, to two different users. As illustrated, a bulk 304 of the content will be the same between the two instances. There is an amount of personalized content 302, 322, however, that will be displayed for each. In order to provide as accurate a copy of the page as possible without conveying personal information, a version 340 of the page can be generated that includes the bulk content 304 but none of the personalized information. Thus, the archive manager 126 of FIG. 1 can collect the information until there is a sufficient number of copies that all contain the bulk information, and it can be verified that the bulk content is sufficiently similar or identical, such that the bulk (or primary) content of the page can be presented as an archive copy.

A difficulty can arise, however, in determining which content is personalized content and which content is bulk content. One approach would be to simply delete any portion of the content that is not identically replicated in the code for each copy. This can potentially cause problems with the archive copy, however, as the structure of the code might cause the page to not display properly if certain portions are deleted without consideration of their impact on other portions of the page.

Accordingly, approaches in accordance with various embodiments can attempt to navigate the tree-structure of an HTML, XML, DOM, or other such page or file in order to determine which portions to keep and which to remove from the various copies of a page. The relationship between the various parent and child nodes (or branches/leaves) of the tree can help to ensure that appropriate and corresponding portions of the content are removed and that the page can or should display properly.

Figure 4A:
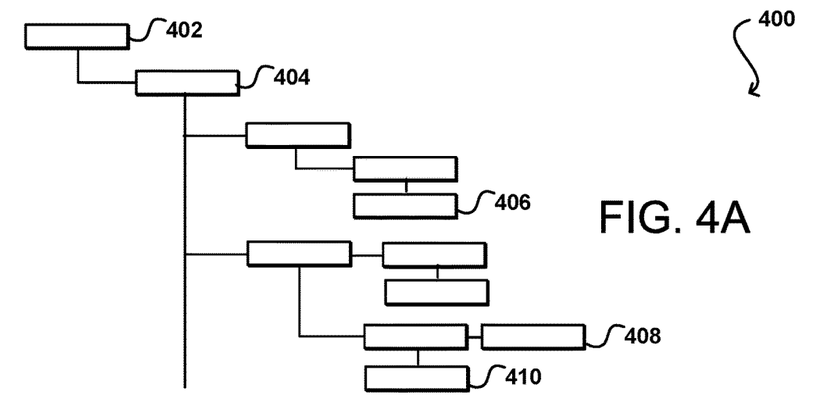
FIGS. 4A, 4B, and 4C illustrate content trees that can be utilized to generate archive content in accordance with various embodiments.
Figure 4B:
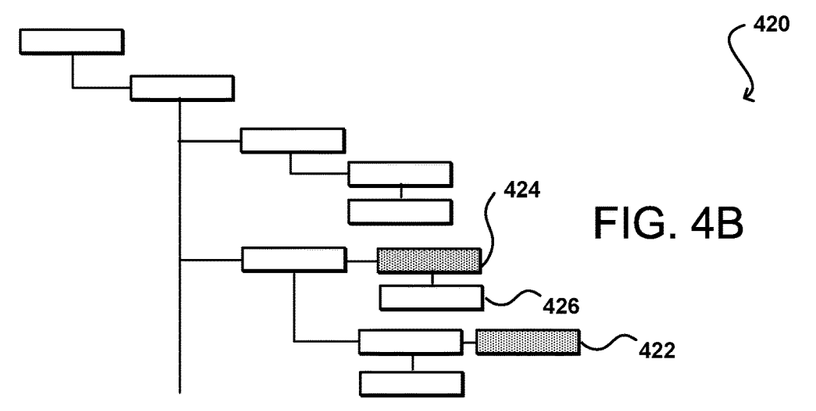
Figure 4C:
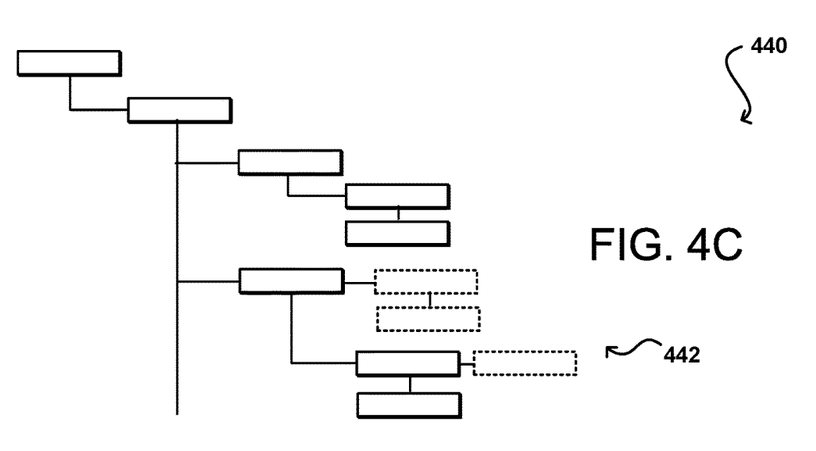

FIGS. 4A, 4B, and 4C illustrate an example approach to selecting primary content for an archive that can be utilized in accordance with various embodiments. This example tree structure can include a parent node 402, as well as various secondary nodes 404, as may relate to headings, body sections, and the like. Under each node will be one or more sub-nodes, or branches, until reaching a leaf node 406, 408, 410 for which there are no additional sub-nodes. Various other trees or structures can be used for types of content discussed herein as well. If comparing the tree 400 of FIG. 4A with the tree 420 of FIG. 4B, the nodes 422, 424 with at least some different content are displayed with a patterned fill, for example parallel lines or dotted patterns. Accordingly, these nodes can be removed from a version 440 of the tree generated using the common nodes as illustrated in FIG. 4C. As illustrated, however, there is a sub-node 426 that, while the similar between the two trees 400, 420, depends from a node 424 that differs between the two trees. Thus, it may be advantageous to remove this sub-node as well in order to ensure accuracy of display and exclusion of personalized content, as well as for other reasons discussed and suggested herein. Accordingly, the tree 440 generated for the archive as illustrated in FIG. 4C does not include the nodes and sub-nodes 442 that differed between the two trees.

In at least some embodiments, a recursive bottom-up node comparison can be utilized. Such an approach starts at the lowest level nodes, or leaf nodes, and performs a comparison across the versions received back from the selected client caches. If, for example, a leaf node 422 is the same across all versions then it can be kept as a leaf node and the process can move up the branch to the parent node. In some embodiments, the first occurrence of a different version of a specific node, among the received versions, can cause that node and any child nodes to be excluded from the aggregate version. In some embodiments, however, the different versions might be analyzed to determine the type of content contained, and whether the node should be completely deleted from the aggregated version. Approaches that remove inconsistent content can be the most likely to prevent the disclosure of personal or confidential data, but may also more general content that would otherwise be required. In some embodiments such as for corporate websites, the default may be to remove any conflicting content so as to ensure that no confidential information or trade secrets are exposed. For such sites, there can also be specific nodes, tags, metadata, or other information included in the pages that indicates that the pages or specific sections should not be aggregated or otherwise for archiving for distribution outside the company. Sensitive information may also take advantage of existing HTML headers that can prevent them from being cached by client devices in general, such that the sensitive data would not be susceptible to disclosure through the aggregation process. In some embodiments any nodes containing session-specific information, as may include a session identifier, may be excluded from the process as well. While information such as credit card and account numbers should not be at risk, as those would not be contained within multiple copies from different devices, approaches can be made to search for specific information, such as credit card numbers or social security numbers, and remove those from the content. This can be accomplished during the aggregation or on the aggregated or generated content before it is transmitted to the requesting client. In other embodiments, security permissions can be examined such that content is not disclosed to entities that would not otherwise have had access to the information had the information been available from its original source.

When removing or excluding nodes or other elements, a consideration should be made in at least some embodiments as to the portion(s) of the node to remove. For example, a node might include formatting information that, if deleted, might impact other formatting or regions of the page.

Accordingly, there may be rules implemented that enable certain content of a node to be retained while other content is deleted. For example, any text between tags may be safely deleted, but any formatting information may be retained. Certain tags relating to personal information may be deleted, but tags or values relating to display properties may be retained. Various other rules can be implemented as would be apparent to one familiar with the content structure in light of the teaching contained herein, as it can be undesirable in at least some embodiments to remove any portion of the content that would cause the generated copy to not display properly or contain errors, etc. In some embodiments, the approach can involve starting at each leaf node and then marching along the respective branch until a node is discovered that is the same among all selected copies, and any nodes below or before that node that were different can be discarded. In other embodiments, all the nodes of the tree can be compared and the nodes along a branch past a node with inconsistent content can be discarded, as well as the node with the inconsistent content itself.

As an example, consider the following code from a requested webpage:

<a href='textpage.html/ref=button'><span class='nay-line-1'>Hello, Ava</span></a>

In this example the name "Ava" appears only for people with that name, and thus would be unlikely to appear in all ten samples pulled for the webpage from device cache. A conservative approach would be to remove the entire code segment listed. A less conservative approach would be to leave the hyperlink tag but remove the span tag, which would remove the inconsistent portion while leaving more of the page and formatting intact. An even less conservative approach, and one that would require more resources, would be to leave everything except the text "Hello, Ava" or even just "Ava" but aggregate everything else, which maximizes the amount of content displayed while still removing the personal data. Such an approach comes with risk, however, as an improper analysis of the content might result in information being improperly disclosed if the entire node is not removed.

In some embodiments, a user can manually search for specific websites that are no longer available, or old versions of existing sites or pages. In some embodiments an attempt can be made to locate the content whenever a particular site or page cannot be found. For example, a user might select a bookmark to a page that was taken down due to content or upon request of the publisher, among other such reasons. In such a circumstance, the content manager could contact an archive manager to attempt to locate a version of the page instead of returning a "page not found" or other such error. If at least some of the content can be located, the content can be displayed, potentially along with a notification that the version displayed is an archived or recovered version and not a currently available version of the page from the indicated location. In some embodiments, an option can be embedded in the browser than enables a user to attempt to select or view a prior version of a page. Various other approaches for triggering the location and/or generation of archive content can be used as well within the scope of the various embodiments.

As mentioned, the content for an aggregated page can be transmitted to a requesting client in a number of different ways. For example, image and other content might still be available from the original location, such that the links in the page can still refer to the original location from which a browser or other application can retrieve the content. In some embodiments, the content can be cached on at least one of the clients and the content can be either transmitted to the archive service, for transmission to the requesting client, or made available for download from the caching client, among other such options. As mentioned, in some embodiments it is sufficient that there is one copy of each image or object located in at least one cache, such that the content can be transmitted or otherwise provided to the requesting client. In some embodiments the images and other static content for an aggregated page can be sent directly to the requesting client. The aggregated page can be sent to the requesting client as an offline version of the page, and the links on the page can be treated as links to online or offline versions depending upon the embodiment and implementation. The aggregating server can request the archived data and, when receiving a sufficient amount of the data, can generate one distilled DOM that contains all the shared elements for distribution.

Figure 5:
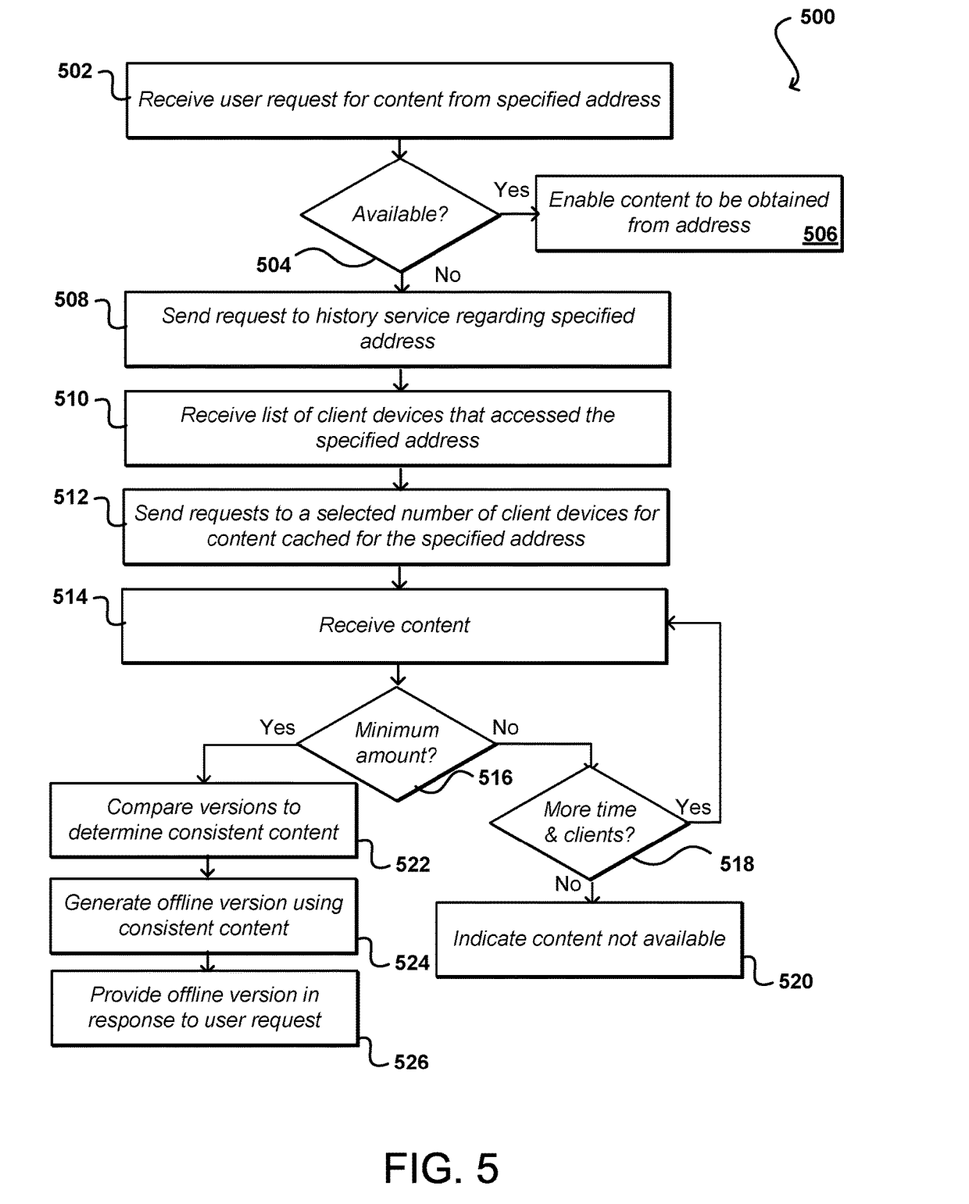
FIG. 5 illustrates an example process for obtaining content from a set of client devices that can be utilized in accordance with various embodiments.

FIG. 5 illustrates an example process 500 for obtaining an archive version of specified content that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a user request is received 502 for content from a specified address. This can include, for example, a request for Internet-based content from a URL or other address provided with, or specified by, the user request. A determination can be made 504 as to whether the content is available from the specified address. This can include, for example, maintaining a list of addresses that are no longer active or receiving an error returned upon requesting the content from the address. In other embodiments the user request might specify a prior period of time or version of the content, or might have selected an option corresponding to content that is no longer available, among other such options. If the content is available from the address, the content can be enabled 506 to be obtained from the address, as well as any addresses or locations specified by that content, such as to image or advertising sources and the like. In various embodiments the request for available content my typically go from a client browser to the destination without first passing through a server-side component, with a notification of the access being provided instead for historical data tracking.

If the content is not currently available from the specified address, a separate request can be sent 508 to a history service, or other such source, regarding the specified address. As mentioned, this can include a request for information regarding client devices that have recently, or during a specific period of time, accessed or retrieved content from the specified location. In this example, the history service can perform a look up against a history repository, table, or other such data source to determine a list of such clients, and a list including information identifying at least a subset of those client devices can be received 510 in response. In this example, requests can then be sent 512 to a selected or determined number of the client devices. This could be, for example, a fixed number, a minimum number, a maximum number, or the total number if less than a maximum threshold, among other such options. In one embodiment, one hundred clients will be contacted if available. The request can be for specific content or any content cached for the specified address, including potentially any additional content linked by, or referred to in, the primary content. Content for the specified address can be located in cache, or other accessible memory or storage, for one or more client devices, and that content can then be received 514 from the devices. In some embodiments the clients will instead send a list of available content and a determination can be made as to which content to retrieve, in order to conserve bandwidth and other resources. In some embodiments there may be no minimum for images or other types of content, but if available then a single copy can suffice.

Upon receiving the content, a determination can be made 516 as to whether the minimum or specified amount of content for the request has been received. This can include, for example, a specified number (e.g., 10) of copies of the code or script for the page, such as a webpage, as well as one copy of the supplemental content (e.g., images, CSS files, or widgets) to be displayed for the page, as may be referred to by hyperlinks and the like. Various other numbers or criteria can be used as well within the scope of the various embodiments. If a minimum or specified amount of content has not yet been received, another determination can be made 518 as to whether there are additional clients that have not yet responded and/or there is time left before a response period has ended, among other potential criteria. If not, in this example a consensus cannot be reached that satisfies the consensus criterion and it can be indicated 520 that the content is not available. As mentioned, in other embodiments at least some of the content might be provided, but not first arriving at a consensus can potentially risk exposing personal, confidential, or other such information. If there are more clients and remaining time for responses, then the process can continue. Once the minimum amount of content has been obtained, the versions of the code, script, or other content received from the various devices can be compared 522 to determine content that is consistent across all versions. As mentioned, in some embodiments consensus among less than all copies or versions may be acceptable. An offline or archive version can then be generated 524 using the consistent content to generate a version that is accurate as of the relevant date and time, or corresponding period, but should not include any personalized or confidential information that would not otherwise have been available to users accessing that content. The offline or archive version can then be provided 526 for display or access in response to the user request. This can include providing at least the code or script, such as an HTML page, and the additional content can be sent directly, linked, or otherwise made available for presentation as well. It can also include a piece by piece generation, where content is pulled from multiple sources as discussed elsewhere herein.

Figure 6:
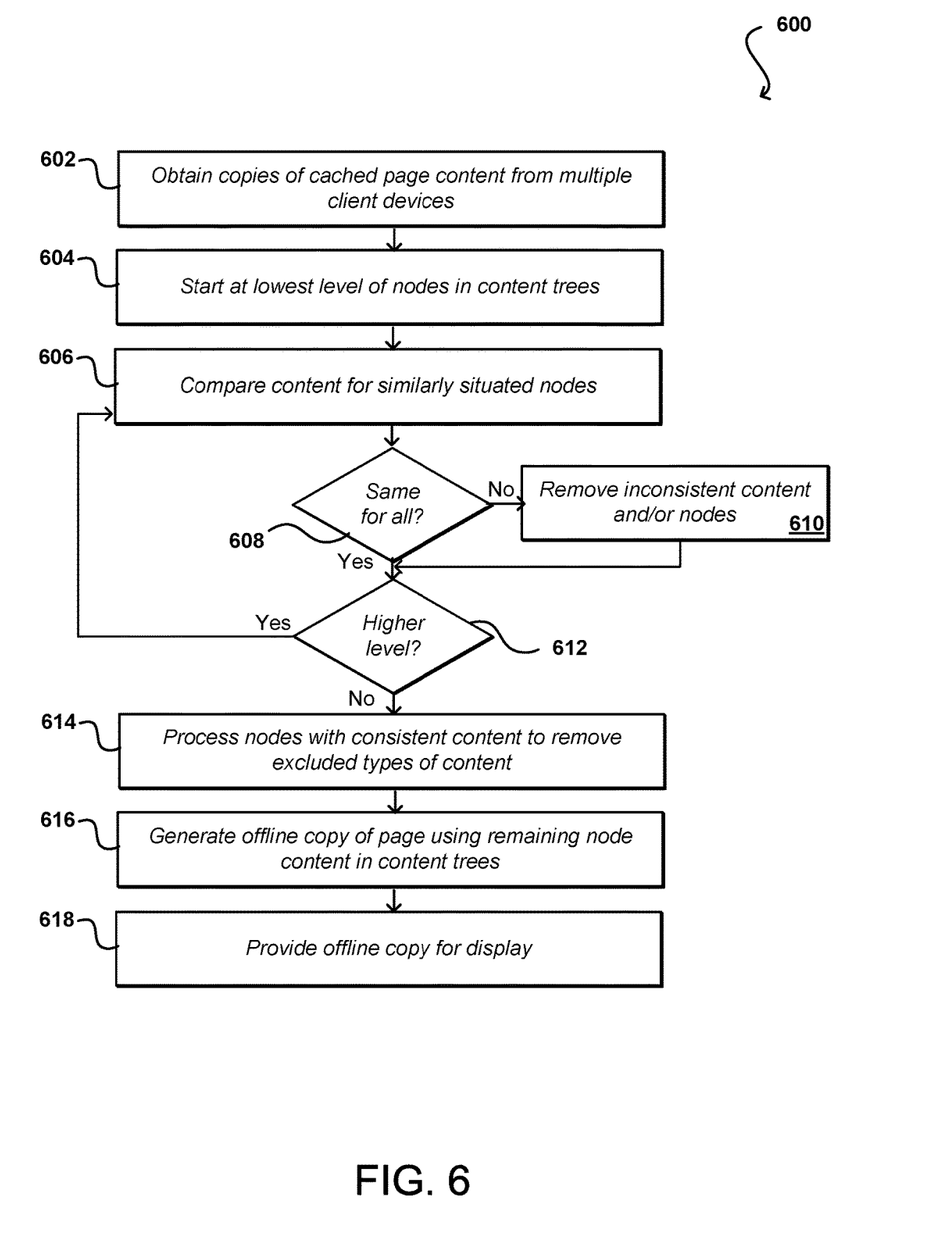
FIG. 6 illustrates an example process for generating a copy of a page including content consistent across multiple instances that can be utilized in accordance with various embodiments.

FIG. 6 illustrates an example process 600 for generating an archive version using content from multiple sources that can be utilized in accordance with various embodiments. In this example, copies of a cached page, or other grouping of content from a location, are obtained 602 from multiple client devices, such as is described with respect to the process 500 of FIG. 5. In order to generate a consistent and accurate copy that does not include customized or personalized information, the content in the various copies can be compared. Since pages such as webpages are structured, such as may utilize various tree structures, one process for comparing the pages can compare corresponding nodes of the trees for each of the pages. In this example the process starts 604 at the bottom level of nodes (i.e., leaf nodes) in the content trees and content in the corresponding or similarly situated nodes in the trees is compared. The content can be compared 606 for similarly situated nodes. If it is determined 608 that the content is not the same across all corresponding nodes, or otherwise fails to satisfy a similarity or consistency criterion, then the nodes with the inconsistent content can be removed 610 from consideration. As mentioned, this can help to ensure that personalized or customized content that may be user- or device-specific is not included in the aggregated version. If the content is the same for the corresponding nodes, and it is determined 612 that there is at least one higher level of nodes, then the comparison process can move up to the higher level of nodes, or up the respective branches, etc., and continue. As mentioned, in at least some embodiments the removal of a node can also result in the removal of all child or sub-nodes for the removed node.

Once all the nodes are evaluated and nodes with inconsistent content removed or adjusted as discussed elsewhere herein, a resulting tree can be obtained that contains the nodes with the consistent content in a similar tree structure. The nodes of this tree in some embodiments can be further processed 614 to remove any excluded types of content. For example, if a social security number, credit card number, date of birth, or other such information is detected in a node then that information can be removed, or at least redacted or obscured, even if that information was consistent across the versions. This may be useful for corporations or other entities that may display consistent information across their users but may not want this information distributed to other users through archive copies, etc. Such an approach also provides an additional layer of security against inadvertent disclosure of sensitive information. After any such processing has completed, an offline or archive copy can be generated 616 or finalized using the remaining content according to the determined tree structure. The offline copy can then be provided 618 for display or other such use. As mentioned, there may be images or other content to be displayed or included with the webpage, and this content can be linked, provided, or otherwise made accessible as discussed and suggested elsewhere herein.

Figure 7:
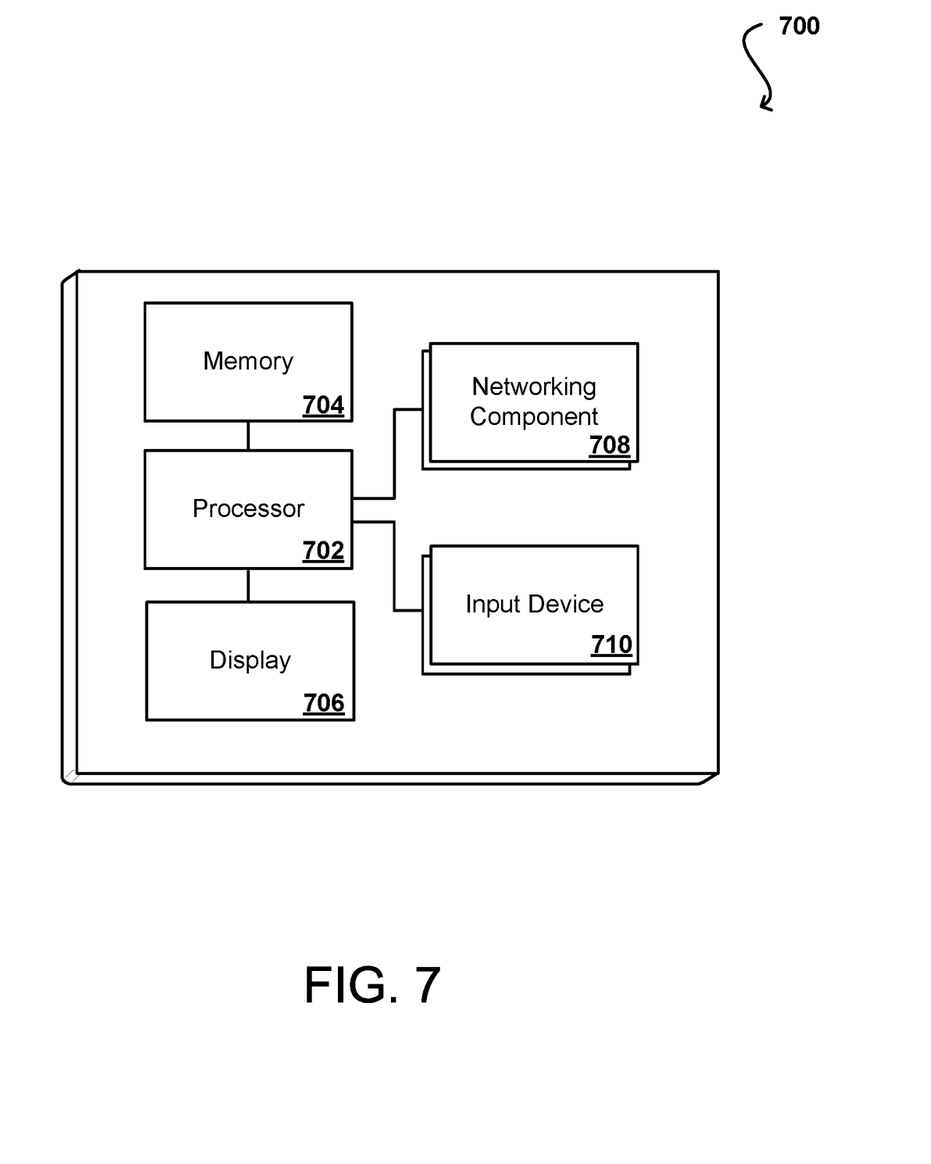
FIG. 7 illustrates example components of a computing device that can be used to implement aspects of the various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, at a resource provider and from a requesting client device, a first request for content, the first request specifying an address from which the content was previously available;
   identifying, from a set of historical access data, a plurality of client devices that previously accessed the address;
   sending, to a plurality of client devices by the resource provider, a second request for the content previously available from the address, at least a subset of the content being stored in cache memory on at least a portion of the plurality of client devices;
   receiving, by the resource provider, copies of the content from two or more of the plurality of devices, the content structured according to a tree structure including a plurality of content nodes;
   comparing respective content for corresponding content nodes;
   generating an archive copy, based on the comparison, of the content according to the tree structure, the archive copy including the respective content for the corresponding content nodes determined to be consistent across the copies of the content from the two or more of the plurality of devices, wherein inconsistent content for corresponding nodes is excluded from the archive copy; and
   providing the archive copy of the content to the requesting client device.

2. The computer-implemented method of claim 1, further comprising:
   comparing the respective content for the corresponding content nodes using a bottom-up, recursive comparison approach starting with leaf nodes of the tree structure.

3. The computer-implemented method of claim 1, further comprising:
   identifying, from the copies of the content, content instances that match restricted content patterns; and
   causing the content instances to be excluded from the archive copy.

4. The computer-implemented method of claim 1, further comprising:
   determining that at least a minimum number of the copies is received before comparing the respective content, an archive copy not being generated unless at least the minimum number of copies are obtained including a portion of the content allowing for a comparison of the respective content in the content nodes of the tree structure.

5. The computer-implemented method of claim 1, further comprising:
determining a specified number of the plurality of client devices for which a long-lived data connection is available.

6. A computer-implemented method, comprising:
receiving, from a requesting client device, a request for content previously available from a specified location;
obtaining, from a plurality of client devices that previously accessed the content from that location, at least a subset of the content, wherein the client devices are capable of storing copies of the content;
determining portions of the content that are consistent across the copies received from the plurality of client devices;
generating a version of the content containing the portions that are consistent while omitting the portions that are inconsistent, based on a comparison of the copies of the content; and
providing the version of the content, to the requesting client device, in response to the request.

7. The computer-implemented method of claim 6, further comprising:
sending an identity of the specified location to a history service, the history service receiving information regarding specified addresses accessed by specific applications executing on the plurality of client devices; and
receiving, from the history service, a list of the client devices having accessed the specified address, wherein the plurality of client devices includes a specified number of devices selected from the list.

8. The computer-implemented method of claim 7, further comprising:
selecting the specified number of client devices based at least in part upon the client devices having a long-lived data connection available.

9. The computer-implemented method of claim 6, further comprising:
determining a tree structure for the content;
comparing respective content for corresponding content nodes of the tree structure; and
generating the version of the content according to the tree structure, the version including the respective content for the corresponding content nodes that is consistent across the corresponding nodes, inconsistent content for corresponding nodes of the copies being excluded from the version.

10. The computer-implemented method of claim 9, further comprising:
comparing the respective content for the corresponding content nodes of the tree structure using a bottom-up, recursive comparison approach starting with leaf nodes of the tree structure.

11. The computer-implemented method of claim 9, wherein the content includes a webpage and the tree structure is defined by a plurality of hypertext markup language tags.

12. The computer-implemented method of claim 6, further comprising:
identifying, from the copies of the content, content instances that match restricted content patterns; and
causing the content instances to be excluded from the archive copy.

13. The computer-implemented method of claim 6, further comprising:
determining supplemental content specified by the content, the supplemental content previously displayed with the content; and
enabling the supplemental content to be displayed with the version of the content provided in response to the request.

14. The computer-implemented method of claim 13, wherein enabling the supplemental content to be displayed includes providing the supplemental content for download, automatically transmitting the supplemental content, or providing links from which the supplemental content can be obtained.

15. The computer-implemented method of claim 6, further comprising:
analyzing one or more tags included in the content; and
excluding, from the version, content associated with a specified type of tag of the one or more tags.

16. A system, comprising:
at least one processor; and
memory including instructions that, when executed by the at least one processor, cause the system to:
receive, from a requesting client device, a request for content previously available from a specified location;
obtain, from a plurality of client devices that previously accessed the content from that location, at least a subset of the content, wherein the client devices are capable of storing copies of the content;
determine portions of the content that are consistent across the copies received from the plurality of client devices;
generate a version of the content containing the portions that are consistent while omitting the portions that are inconsistent, based on a comparison of the copies of the content; and
provide the version of the content, to the requesting client device, in response to the request.

17. The system of claim 16, wherein the instructions when executed further cause the system to:
send an identity of the specified location to a history service, the history service receiving information regarding specified addresses accessed by specific applications executing on the plurality of client devices;
receive, from the history service, a list of the client devices having accessed the specified address, wherein the plurality of client devices includes a specified number of devices selected from the list; and
select the specified number of client devices based at least in part upon the client devices having a long-lived data connection available.

18. The system of claim 16, wherein the instructions when executed further cause the system to:
determine a tree structure for the content;
compare respective content for corresponding content nodes of the tree structure; and
generate the version of the content according to the tree structure, the version including the respective content for the corresponding content nodes that is consistent across the corresponding nodes, inconsistent content for corresponding nodes of the copies being excluded from the version.

19. The system of claim 16, wherein the instructions when executed further cause the system to:

identify, from the copies of the content, content instances that match restricted content patterns; and cause the content instances to be excluded from the archive copy.

20. The system of claim 16, wherein the instructions when executed further cause the system to:

determine supplemental content specified by the content, the supplemental content previously displayed with the content; and enable the supplemental content to be displayed with the version of the content provided in response to the request, wherein enabling the supplemental content to be displayed includes providing the supplemental content for download, automatically transmitting the supplemental content, or providing links from which the supplemental content can be obtained.

\* \* \* \* \*